United States Patent
Low et al.

(10) Patent No.: US 7,363,960 B2
(45) Date of Patent: Apr. 29, 2008

(54) HEAT TRANSFER OF A REMOTE HEAT SOURCE USING A LOOP HEAT PIPE

(75) Inventors: Lenny Low, Hillsborough, CA (US); Randy Pon, San Francisco, CA (US)

(73) Assignee: Space Systems/Loral, Palo Alto, CA (US)

(*) Notice: Subject to any disclaimer, the term of this patent is extended or adjusted under 35 U.S.C. 154(b) by 1373 days.

(21) Appl. No.: 09/822,073

(22) Filed: Mar. 30, 2001

(65) Prior Publication Data
US 2002/0139511 A1 Oct. 3, 2002

(51) Int. Cl.
*F28F 7/00* (2006.01)
(52) U.S. Cl. .......................... 165/41; 165/46
(58) Field of Classification Search ............ 165/41, 165/46, 104.33, 185
See application file for complete search history.

(56) References Cited

U.S. PATENT DOCUMENTS 5,743,325 A * 4/1998 Esposto ................... 165/412

* cited by examiner

*Primary Examiner*—Leonard R Leo
(74) *Attorney, Agent, or Firm*—Kenneth W. Float; Anthony W. Karambelas

(57) ABSTRACT

Heat transfer systems and methods 30 for use on a spacecraft that use a loop heat pipe to transfer heat from a remotely located heat source to a thermal radiator or other heat dissipating apparatus. The loop heat pipe is a two phase heat transfer device that has an evaporator coupled to the heat source and a condenser coupled to the thermal radiator or other heat dissipating apparatus. The loop heat pipe comprises thin walled tubing to connect the evaporator and condenser. The thin walled tubing allows the loop heat pipe to be flexible. This flexibility offers significant advantages in terms of routing and accommodating design

6 Claims, 3 Drawing Sheets

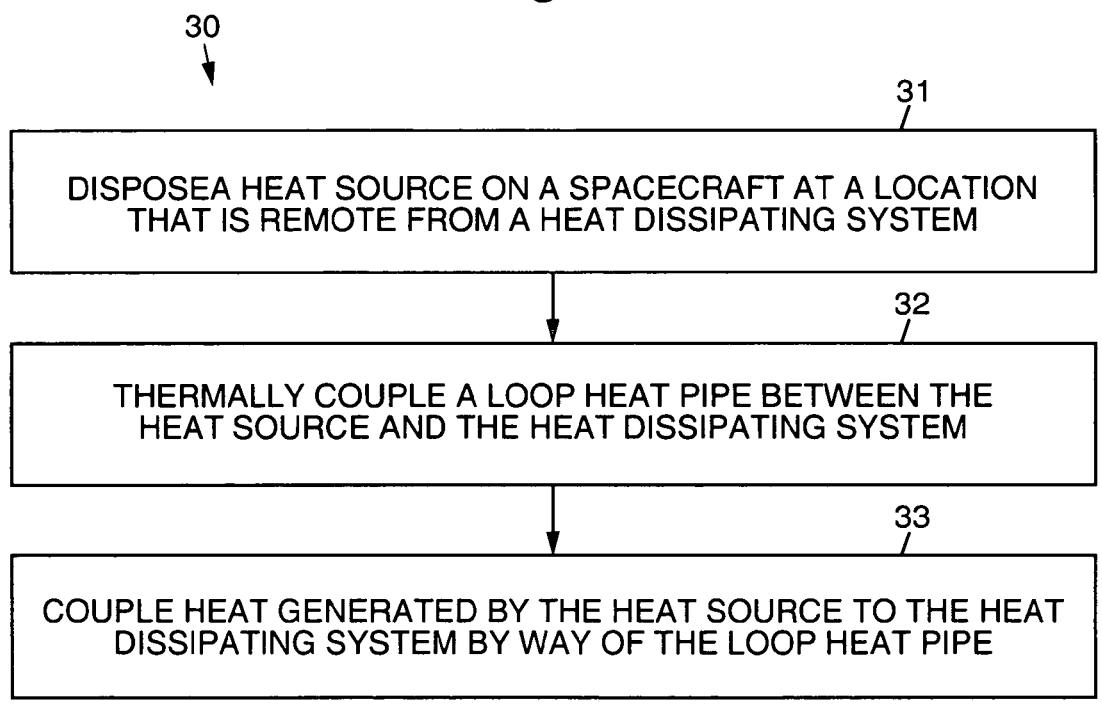

HEAT TRANSFER OF A REMOTE HEAT SOURCE USING A LOOP HEAT PIPE

BACKGROUND

The present invention relates generally to spacecraft, and more specifically, to the transfer of heat from a remote heat source to a thermal radiator using a loop heat pipe.

The assignee of the present invention manufactures and deploys spacecraft into geosynchronous and low earth orbits. Such spacecraft use one or more radiator systems to dissipate heat generated by equipment on the spacecraft. The radiator systems transfer thermal energy to radiator panels where it is radiated into space.

Many times on spacecraft, a heat dissipating component is not conveniently located near a thermal radiator. The heat needs to be transferred to the thermal radiator to appropriately dissipate the heat. Conventional heat transfer systems used heat straps and conventional rigid heat pipes (fixed conductance heat pipes) to solve the heat transfer problem. It would be advantageous to have an improved way to transfer the heat that is more weight efficient and has less impact on the overall spacecraft configuration.

Accordingly, it is an objective of the present invention to provide heat transfer systems and methods that transfer heat from a remotely located heat source to a spacecraft thermal radiator or other heat dissipating apparatus.

SUMMARY OF THE INVENTION

To accomplish the above and other objectives, the present invention provides for heat transfer systems and methods that use a loop heat pipe to transfer heat from a remotely located heat source to a spacecraft thermal radiator or other heat dissipating apparatus. The loop heat pipe accomplishes this heat transfer task in a more weight efficient and with lower impact to the overall spacecraft configuration than conventional techniques.

More particularly, the heat transfer system is used with a heat dissipation component or heat source not located on a heat pipe panel or mounted on a thermal radiator. The loop heat pipe is used to transport heat from the remotely located heat dissipation component or heat source the thermal radiator or heat pipe panel.

The loop heat pipe is a two phase heat transfer device which has a discrete evaporator (where heat goes into the device) and a discrete condenser (where heat is rejected by the device). The loop heat pipe uses thin walled tubing to connect the evaporator and condenser. The thin walled tubing allows the loop heat pipe to be flexible unlike conventional heat pipes which are rigid. The flexibility of the loop heat pipe offers significant advantages in terms of routing, accommodating design changes and bending the transport lines after installation to avoid other spacecraft components.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 3 is a flow diagram illustrating an exemplary heat transfer method in accordance with the principles of the present invention.

DETAILED DESCRIPTION

Figure 1:
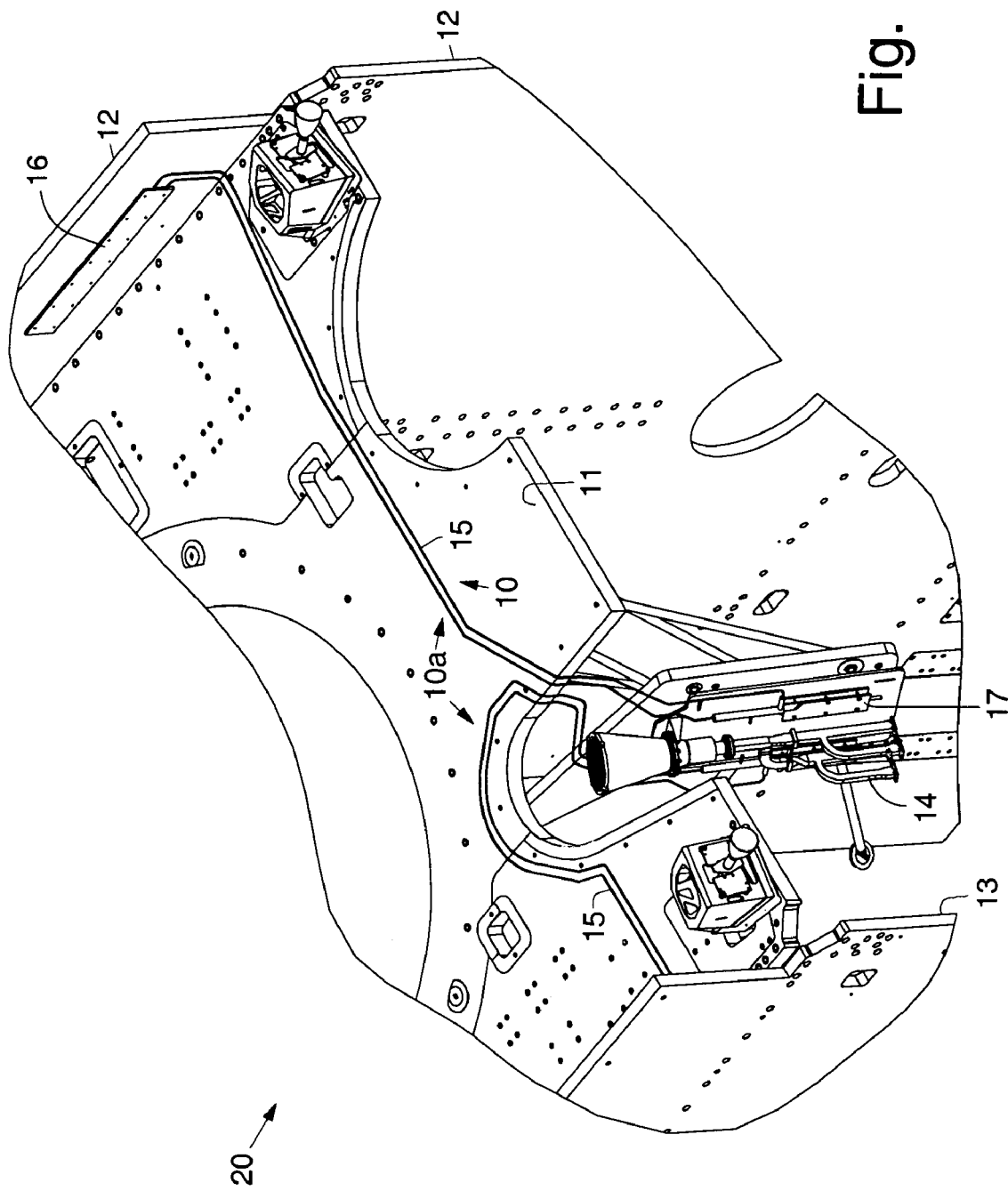
FIG. 1 is a perspective view of a portion of a spacecraft and illustrates an exemplary heat transfer system in accordance with the principles of the present invention.
Figure 2:
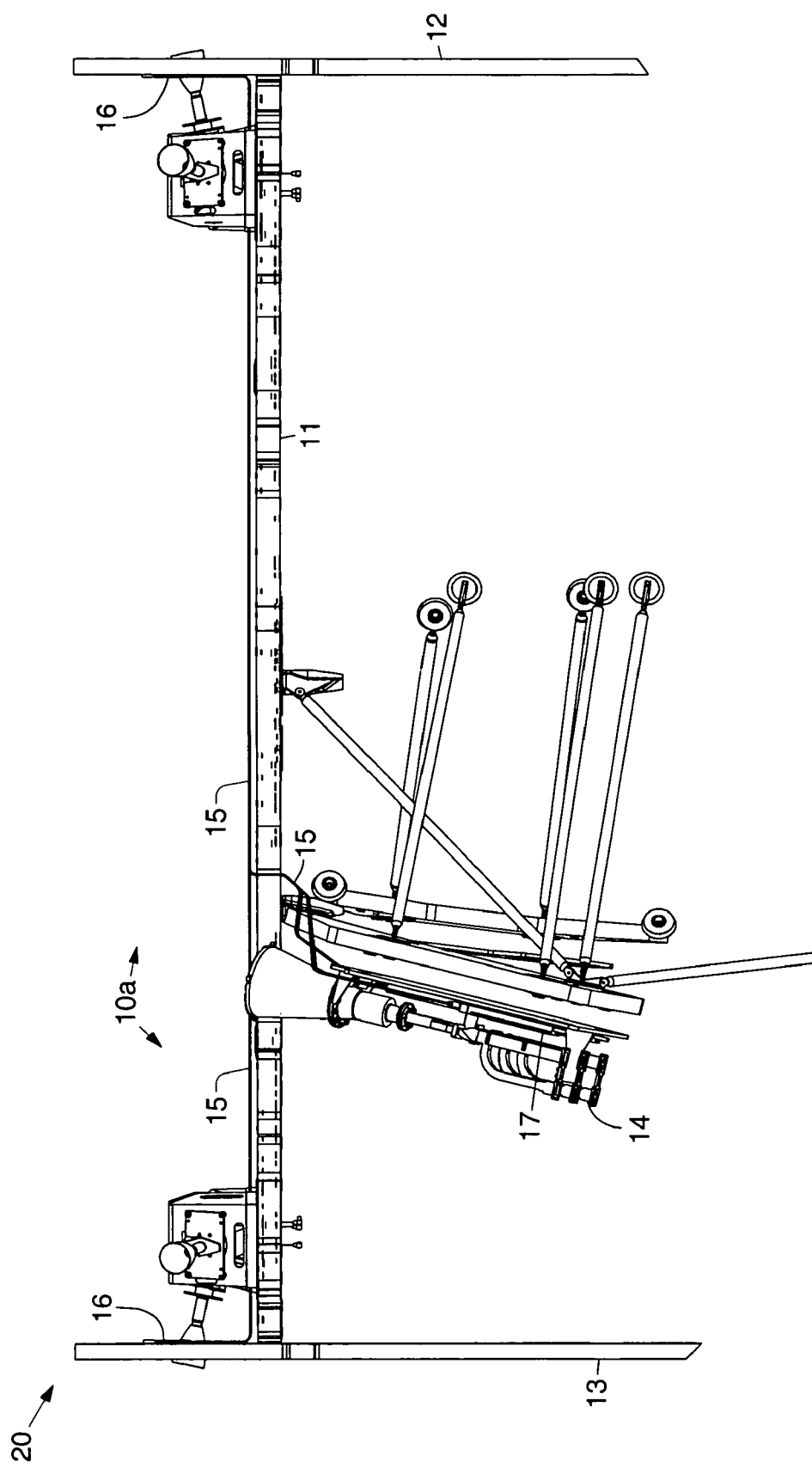
FIG. 2 is a side view of the spacecraft and heat dissipation system shown in FIG. 1.

Referring to the drawing figures, FIG. 1 is a perspective view of a portion of a spacecraft 20 and illustrates an exemplary heat transfer system 10a, (or heat dissipation system 10a) in accordance with the principles of the present invention. FIG. 2 is a side view of the spacecraft 20 and heat dissipation system 10a shown in FIG. 1.

The spacecraft 20 illustrated in FIGS. 1 and 2 comprises an Earth deck 11 that is a transverse panel of the spacecraft 20 on which heat dissipating equipment (heat sources 14) are located. The Earth deck 11 attached to North and South radiator panels 12, 13. Exemplary heat dissipating equipment 14 or heat source 14 is shown as a Ku-band feed horn 14, although there are other heat sources that are located remotely from either of the radiator panels 12, 13, or from heat dissipating apparatus such as heat pipe panels, RF loads, output multiplexer (OMUX) filters, RF switches and circulators (not shown).

Referring to the drawing figures, FIG. 1 is a perspective view of a portion of a spacecraft 20 and illustrates an exemplary heat transfer system 10a, (or heat dissipation system 10a) in accordance with the principles of the present invention. FIG. 2 is a side view of the spacecraft 20 and heat dissipation system 10a shown in FIG. 1.

The spacecraft 20 illustrated in FIGS. 1 and 2 comprises an Earth deck 11 that is a transverse panel of the spacecraft 20 on which heat dissipating equipment (heat sources 14) are located. The Earth deck 11 attached to North and South radiator panels 12, 13. Exemplary heat dissipating equipment 14 or heat source 14 is shown as a Ku-band feed horn 14, although there are other heat sources that are located remotely from either of the radiator panels 12, 13, or from heat dissipating apparatus such as heat pipe panels, RF loads, output multiplexer (OMUX) filters, RF switches and circulators (not shown).

The exemplary heat transfer system 10a comprises a loop heat pipe 10. The loop heat pipe 10 comprises flexible thin walled tubing 15 comprising a loop heat pipe transport line 15 that is coupled between one or more evaporators 17 that are thermally coupled to the heat source 14 (Ku-band feed horn 14) and one or more condensers 16 that are thermally coupled to one or more of the radiator panels 12, 13.

The loop heat pipe 10 is a two phase heat transfer device that includes the discrete evaporator 17 (where heat goes into the loop heat pipe 10) and the discrete condenser 16 (where heat is rejected by the loop heat pipe 10). The loop heat pipe 10 uses thin walled tubing to connect the evaporator 17 and condenser 16. The thin walled tubing 15 allows the loop heat pipe 10 to be flexible, unlike conventional heat pipes which are rigid. The flexibility of the loop heat pipe 10 offers significant advantages in terms of routing and accommodating design changes.

The loop heat pipe 10 implemented by the present invention offers an orders-of-magnitude performance advantage over the use of heat straps for heat sources 14 mounted in locations remote from radiator panels 12, 13. The thermal conductance of a one meter long one-inch by one-inch cross section copper heat strap is only 0.02 W/° C., whereas the loop heat pipe 10 has a thermal conductance of 40 W/° C. The use of the loop heat pipe 10 provides an increase in heat dissipating performance of 2,000 times compared to the conventional copper heat strap.

The present invention also offers significant advantages over conventional rigid heat pipe technology. The flexible tubing 15 used in the loop heat pipe 10 offers flexibility in routing. Routing and mounting area is very important on spacecraft 20 developed by the assignee of the present invention. Current spacecraft 20 are usually packed to the maximum with payload and bus equipment. Any relief or flexibility in routing heat dissipating devices provide significant advantages. In addition, the loop heat pipe transport line 15 can be bent after installation, thereby avoiding interference with other spacecraft components. This also offers significant advantages over conventional heat pipe technology.

The loop heat pipe 10 also has a higher heat transport capability than conventional heat pipes, which gives the advantage of mass and ground testability. Conventional heat pipes must be oriented in a nearly horizontal or in reflux (liquid at the bottom) configuration to work on the ground. The superior heat transport ability of the loop heat pipe 10 allows for up to two meters of elevation above ground. This offers significant advantage in ground testability.

FIG. 3 is a flow diagram illustrating an exemplary heat transfer method 30 in accordance with the principles of the present invention. The exemplary method 30 comprises the following steps.

A heat source 14 is disposed 31 on a spacecraft 20 at a location that is remote from a thermal radiator 12, 13. A heat transfer system 10a comprising a loop heat pipe 10 is thermally coupled 32 between the heat source 14 and the thermal radiator 12, 13. Heat generated by the heat source 14 is coupled 33 to the thermal radiator 12, 13 by way of the loop heat pipe 10.

Thus, a heat transfer system comprising a loop heat pipe and heat transfer method that transfers heat from a remotely located heat source to a spacecraft thermal radiator have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A heat transfer system comprising:
   a spacecraft comprising a heat dissipating system;
   a remotely-located heat source disposed on the spacecraft at a location that is remote from the heat dissipating system and which is not located on a heat pipe panel; and
   a loop heat pipe thermally coupled between the remotely-located heat source and the heat dissipating system for coupling heat generated by the heat source to the heat dissipating system.

2. The heat transfer system recited in claim 1 wherein the loop heat pipe comprises flexible thin walled tubing coupled between an evaporator that is thermally coupled to the remotely-located heat source and a condenser that is thermally coupled to the heat dissipating system.

3. The spacecraft recited in claim 2 wherein the loop heat pipe comprises flexible thin walled tubing coupled between an evaporator that is thermally coupled to the remotely-located heat source and a condenser that is thermally coupled to heat dissipating system.

4. A spacecraft comprising:
   a heat dissipating system for radiating heat into space;
   a remotely-located heat source disposed at a location that is remote from the heat dissipating system and which is not located on a heat pipe panel; and
   a loop heat pipe thermally coupled between the remotely-located heat source and the heat dissipating system for coupling heat generated by the remotely-located heat source to the heat dissipating system.

5. A heat dissipation method for use on a spacecraft comprising the steps of:
   disposing a remotely-located heat source on a spacecraft at a location that is remote from a heat dissipating system and which is not located on a heat pipe panel;
   thermally coupling a loop heat pipe between the remotely-located heat source and the heat dissipating system; and
   coupling heat generated by the remotely-located heat source to the heat dissipating system by way of the loop heat pipe.

6. The method recited in claim 5 wherein the loop heat pipe comprises flexible thin walled tubing coupled between an evaporator that is thermally coupled to the remotely-located heat source and a condenser that is thermally coupled to heat dissipating system.

* * * * *